United States Patent [19]

Koike

[11] Patent Number: 4,801,880
[45] Date of Patent: Jan. 31, 1989

[54] DEVICE FOR MEASURING THE SPEED OF A MOVING OBJECT

[75] Inventor: Eishi Koike, Sagamihara, Japan

[73] Assignee: Ozen Corporation, Tokyo, Japan

[21] Appl. No.: 103,397

[22] Filed: Oct. 1, 1987

[30] Foreign Application Priority Data

Nov. 28, 1986 [JP] Japan .................................. 61-183092

[51] Int. Cl.⁴ .......................... G01C 1/22; A63B 69/38
[52] U.S. Cl. .................................... 324/178; 273/29 A
[58] Field of Search ................ 73/488, 597; 273/29 A, 273/29 R; 324/178

[56] References Cited

U.S. PATENT DOCUMENTS

| | | | |
|---|---|---|---|
| 1,950,273 | 3/1934 | Speakman | 324/178 |
| 2,157,572 | 5/1939 | Roberts | 324/178 |
| 2,626,312 | 1/1953 | Clark et al. | 324/178 |
| 3,024,414 | 3/1962 | Nordquist | 324/178 |
| 3,381,291 | 4/1968 | Dumbeck | 324/178 |

FOREIGN PATENT DOCUMENTS 0122704 3/1984 European Pat. Off. .
3225843 1/1984 Fed. Rep. of Germany ... 273/29 A
1370332 10/1974 United Kingdom ............ 273/29 R
8405124 2/1984 United Kingdom .

*Primary Examiner*—Stewart J. Levy
*Assistant Examiner*—Lawrence G. Fess
*Attorney, Agent, or Firm*—Arnold S. Weintraub

[57] ABSTRACT

A speed of movement of a moving object, e.g., a tennis ball, which moves a predetermined distance is determined by measuring a time interval between a first detection of a vibration wave produced in the ball when it is hit by the tennis player's racket and a second detection of another vibration wave produced when the ball collides with the court surface. A vibration sensor for performing the first detection, and a microcomputer for computing the movement speed of the ball, and a liquid crystal display for displaying the movement speed are accommodated in a case which is mounted on the tennis racket. A sound collecting micrphone which performs the second detection is attached to the lower edge of the net near a ball landing position on the court, and the detection signal is transmitted over a radiowave to a receiver accommodated in the case.

4 Claims, 4 Drawing Sheets

DEVICE FOR MEASURING THE SPEED OF A MOVING OBJECT

BACKGROUND OF THE INVENTION

1. Field of the Invention

The present invention relates to a device for measuring a speed of movement of an object, and in particular, to a device for measuring a speed of a moving object, for example, a tennis ball which moves a predetermined distance between a starting point and a landing point.

2. Description of the Prior Art

A movement speed measuring device of a moving object is known in the art in which, for example, an electromagnetic wave such as a laser beam, or an ultrasonic wave of a predetermined frequency is transmitted against the moving object, and the frequency of a reflected wave reflected from the moving object is measured to determine a speed of movement of the object by utilizing the Doppler effect.

However, in this prior art movement speed measuring device, an instantaneous speed of the moving object can be measured accurately. On the other hand, the drawbacks are involved in that since the electromagnetic wave or ultrasonic wave of a predetermined frequency has to be transmitted against the moving object, another person is required to perform the transmission operation. Thus, for example, in the practice of serving in tennis, in order that the server himself knows a speed of the tennis ball served by him, it is necessary to ask another person for help. Consequently, it is inconvenient, and further, the movement speed measuring device per se becomes large in size and expensive.

SUMMARY OF THE INVENTION

The present invention was made in view of the problems involved in the prior art, and it is an object of the present invention to provide a movement speed measuring device of a moving object capable of measuring easily without help of others a mean speed of movement of the object which transmits vibration waves such as sound waves respectively at a movement starting time and at a landing time.

In order to achieve the object, in a movement speed measuring device for measuring a speed of movement of an object which transmits vibration waves such as sound waves at a movement starting time and at a movement finishing time after moving a predetermined distance, the present invention is characterized by movement start detecting means for detecting the vibration wave transmitted at the movement starting time of the object, movement finish detecting means for detecting the vibration wave transmitted at the movement finishing time, time measuring means for measuring a time interval between a time point at which the vibration wave is detected by the movement start detecting means and a time point at which the vibration wave is detected by the movement finish detecting means, speed computing means for computing a movement speed of the object on the basis of the measured time interval and the predetermined distance, and a display unit for displaying the result of the computation by the computing means. In this case, the movement finish detecting means may detect the vibration wave transmitted by the object not only when the object collides with a fixed object including the ground surface, a wall, etc., but when the object collides with a fluid including water, oil, or the like. Further, the term, the movement finishing time implies not only the object stops movement but the object changes a direction of movement.

In the present invention, in the measurement of a movement speed of an object which transmits vibration waves such as sound waves respectively at the movement starting time and at the landing time, and which moves a predetermined distance, the vibration wave transmitted by the object at the movement starting time is detected by movement start detecting means including a vibration sensor, a microphone, etc., and the time measurement by time measuring means is started upon detection of the movement starting time. Next, when the vibration wave including the sound wave or the like is transmitted at the time of reaching a movement finishing position after moving a predetermined distance, the vibration wave is detected by movement finish detecting means including a sound collecting microphone or the like, and at the same time, the time measurement by the time measuring means is stopped. The movement speed of the object is calculated by speed computing means based on the result of the time measurement by the time measuring means and the predetermined distance, and the computed result is displayed on a display unit. Accordingly, it is possible to know the movement speed of the object visually, easily and automatically.

Therefore, there is no need to transmit an electromagnetic wave or an ultrasonic wave against the moving object as in the prior art movement speed measuring device which utilizes the Doppler effect, and the movement speed of the object can be measured without help of others. Furthermore, the advantage is provided in that the overall arrangement can be made simple and small in size, and an inexpensive movement speed measuring device can be provided.

DESCRIPTION OF THE PREFERRED EMBODIMENT

Hereinafter, an embodiment of the present invention will be described with reference to the drawings.

Figure 1:
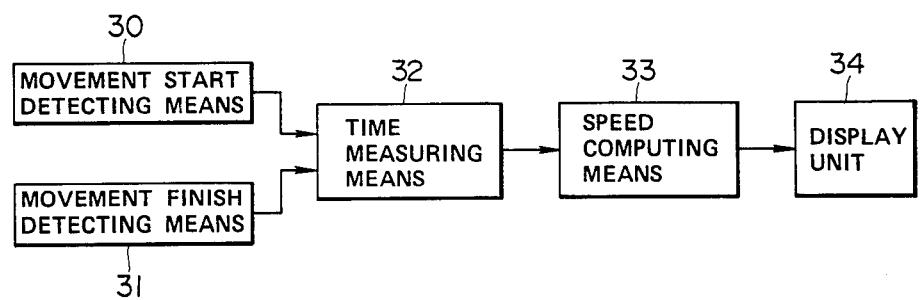
FIG. 1 is a block diagram of a fundamental arrangement of the present invention.

In FIG. 1, the reference numeral 30 designates movement start detecting means such as a vibration sensor or the like for detecting a vibration wave at a movement starting time of a moving object, 31 designates movement finish detecting means such as a sound collecting microphone or the like for detecting a vibration wave transmitted by the moving object when it collides with the ground surface or the like upon arriving at a movement finishing position spaced from the movement starting position by a predetermined distance, 32 designates time measuring means which starts time measurement in response to a detection signal from the movement start detecting means 30 and stops the time measurement in response to a detection signal from the movement finish detecting means 31, 33 designates speed computing means for computing a movement speed of the moving object based on the result of the time measurement by the time measuring means and the predetermined movement distance of the moving object, and 34 designates a display unit for displaying the result of the computation by the speed computing means.

Next, a concrete example of the arrangement of the movement speed measuring device mentioned above will be described with reference to FIG. 2 wherein the present invention is applied to measurement of a movement speed of a tennis ball at the time of serving the ball.

Figure 2:
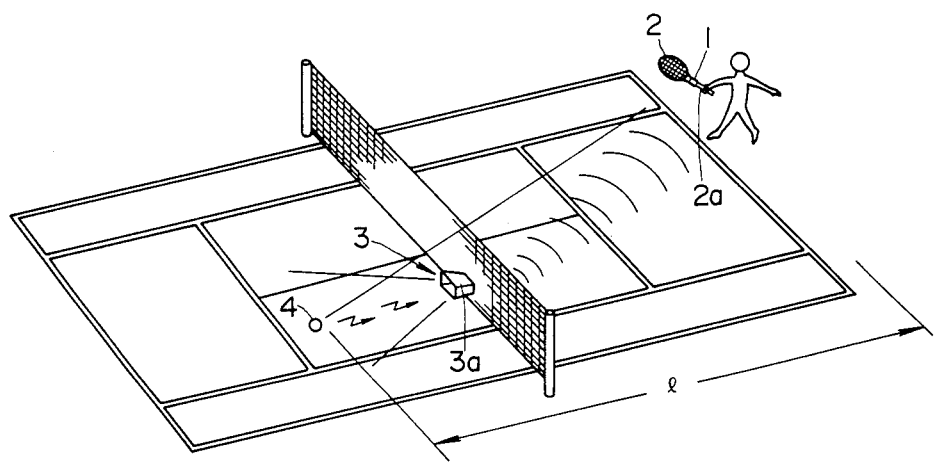
FIG. 2 is a perspective view of an embodiment of the present invention wherein the moving object is a tennis ball.
Figure 3:
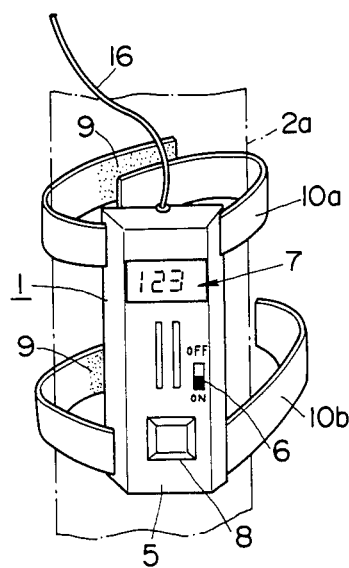
FIG. 3 is a perspective view showing the external appearance of an example of main body of a movement speed measuring device.

In FIG. 2, the reference numeral 1 designates a main body of a movement speed measuring device mounted on a tennis racket 2, and 3 designates movement finish detecting means including a sound collecting microphone 3a located near a landing position (a movement finishing position) of a tennis ball 4.

The movement speed measuring device main body 1 has a case 5 of relatively light weight, which is formed from synthetic resin or the like, and on the outer surface of the case 5, there are provided a power supply switch 6, a liquid crystal display 7 serving as a display unit for displaying the movement speed, and a clear button 8 for clearing the display on the liquid crystal display 7. Further, belts 10a and 10b having velvet fasteners 9 are respectively secured to the upper and lower portions of the case 5, and the movement speed measuring device main body 1 is mounted on a stick 2a of the tennis racket 2 by these members.

Within the case 5, there are provided a vibration sensor 11 constituted by a piezoelectric ceramic plate or the like serving as the movement start detecting means for detecting a vibration wave generated when the tennis ball is hit with the tennis racket 2, and a processing circuit 12 constituting the time measuring means, the speed computing means, etc.

Figure 4:
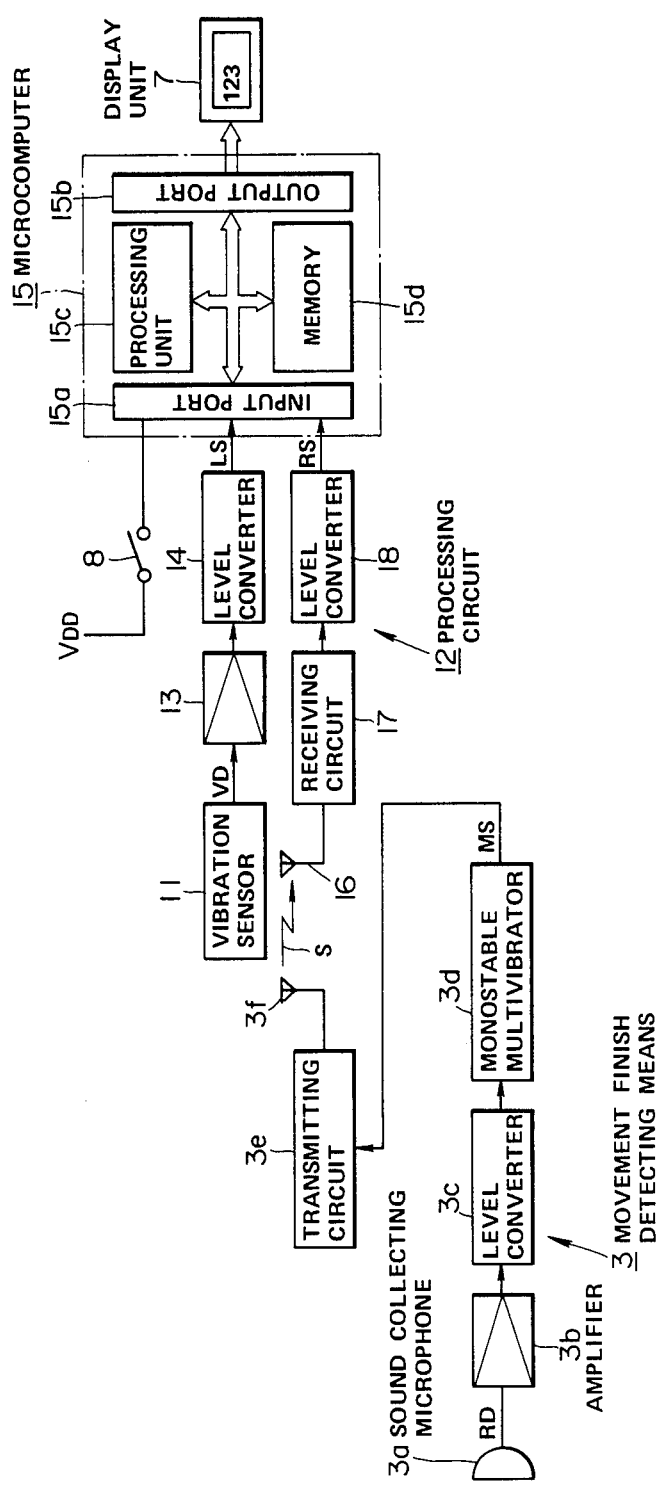
FIG. 4 is a block diagram of an example of a processing circuit applicable to the present invention.

An example of the processing circuit 12 is shown in FIG. 4. A vibration detection signal from the vibration sensor 11 is supplied to an input port 15a of a microcomputer 15 through an amplifier 13 and a level converter 14 constituted by a timer IC or the like. A transmitting signal transmitted from landing detcting means and received by a receiving antenna 17 is supplied to the input port 15a of the computer 15 through a receiving circuit 17 and a level converter 18.

The microcomputer 15 includes at least the input port 15a, an output port 15b, a processing unit 15c for performing predetermined computation and processing based on the inputs supplied to the input port 15a, and a memory 15d for storing a program for executing the computation and processing by the processing unit 15c, and constants. The processing unit 15c starts the time measurement when the vibration detection signal of the vibration sensor 11 is supplied to the input port 15a and stops the time measurement when the transmitting signal from the landing detecting means 3 is supplied to the input port 15a. The processing unit 15c computes an equation $V = 1/T$ to determine a movement speed V of the tennis ball 4 based on a measured time interval T, and a distance 1 between predetermined one end line of the tennis court and the other service line. The determined movement speed V is outputted as display data from the output port 15b to the liquid crystal display 7.

The movement finish detecting means 3 includes, as shown in FIG. 4, a sound collecting microphone 3a located near the service line which corresponds to the landing position, for example, mounted on the lower edge of a net, an amplifier 3b for amplifying an output of the sound collecting microphone 3a, a level converter 3c for converting a level of the amplified output, a monostable multivibrator 3d which is triggered by a leading edge of the level converted output, a transmitting circuit 3e which is supplied with the output of the monostable multivibrator 3d as a transmission control signal, and a transmitting antenna 3f for radiating a transmitting signal supplied from the transmitting circuit 3e.

The operation in the aforementioned embodiment will be described with reference to a flowchart in FIG. 5.

Figure 5:
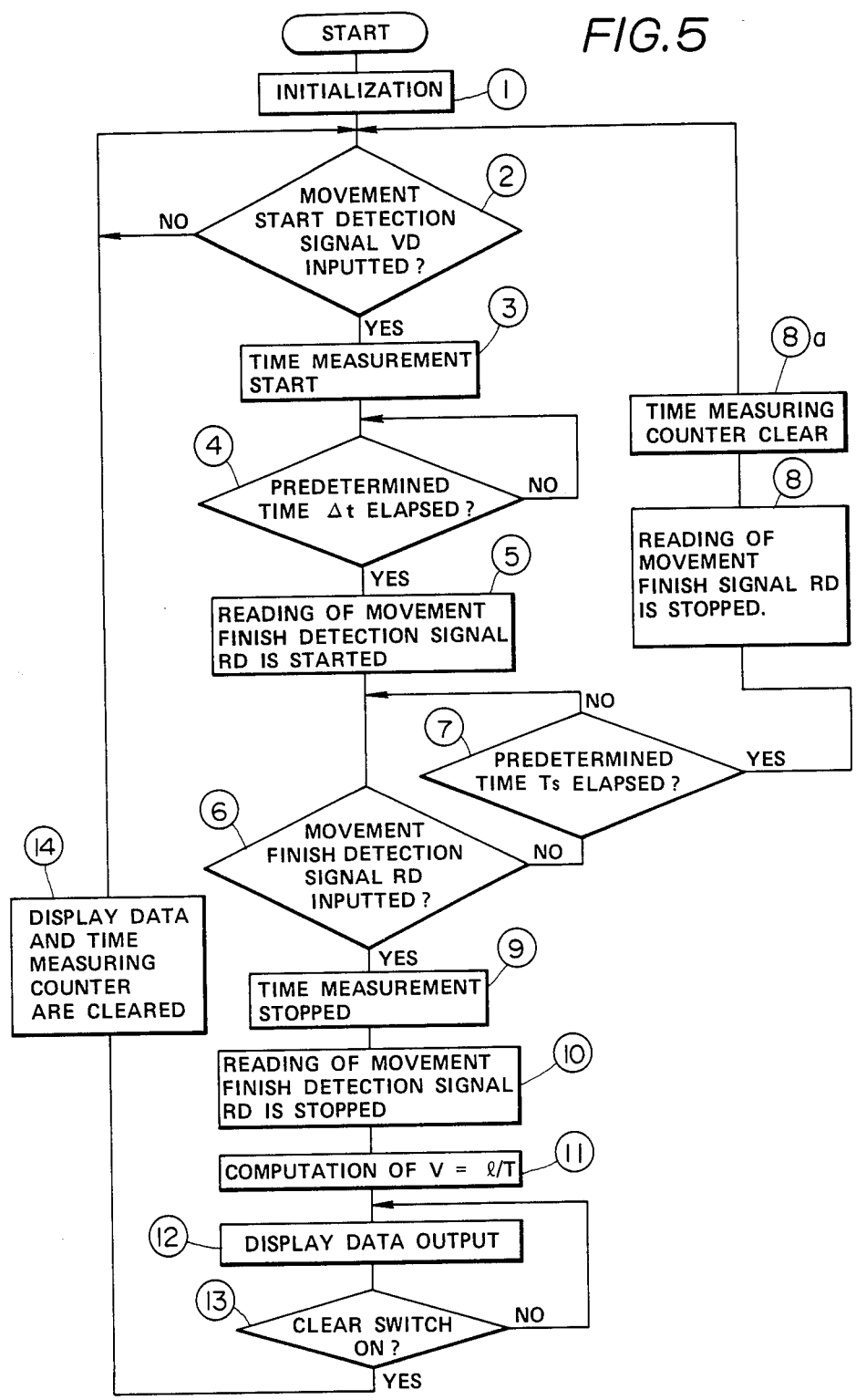
FIG. 5 is a flowchart of an example of a processing procedure executed by a microcomputer.

Upon turning on the power supply switch 6, the processing shown in FIG. 5 is executed in the processing unit 15c in the microcomputer 15.

Figure 6:
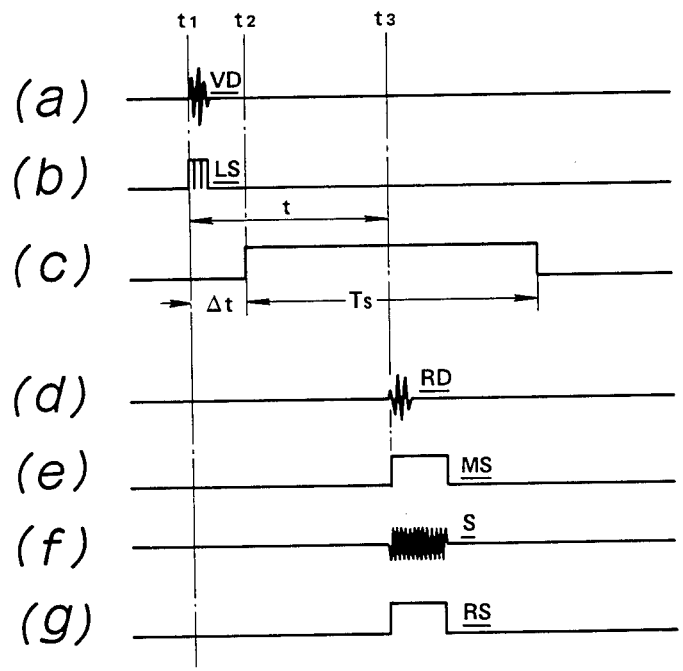
FIG. 6 is a signal waveform diagram showing waveforms at various parts of the processing circuit for explaining the operation of the present invention.

Specifically, in step , initialization is carried out to clear the display data stored in a predetermined memory area of the memory 15d for displaying on the liquid crystal display unit 7 to zero. Then, it proceeds to step to decide whether or not a vibration detection signal VD equal to or higher than a predetermined level has been inputted from the vibration sensor 11. At this time, when the vibration detection output VD has not been inputted, the program waits until the vibration detection signal VD is inputted. When the vibration detection signal VD is inputted, it proceeds to step . Accordingly, when a tennis player having the tennis racket 2 mounted with the movement speed measuring device main body 1 thereon stands on a service position, and serves at a time point $t_1$, a vibration wave is produced in the ball 4, and in the tennis racket 2 due to hitting of the tennis ball 4 with the tennis racket 2. This vibration wave is transmitted to the speed measuring device main body 1 through a gut and a frame of the tennis racket 2, and it is detected as shown in FIG. 6, at (a) by the vibration sensor 11 provided inside the main body 1. The vibration detection signal VD from the vibration sensor 11 is amplified by the amplifier 12, and is converted by the level converter 13 to a level signal LS having a predetermined level as shown in FIG. 6, at (b). Then, it is inputted to the input port 15a of the microcomputer 15.

When the vibration detection signal VD is inputted to the input port 15a of the microcomputer 15, the program proceeds from step to step , and the time measurement is started by causing a time counter to start counting up at a predetermined period.

Next, the program proceeds to step , and it is decided whether or not a predetermined time $\Delta t$ (e.g., 0.1 sec) is elapsed. When the predetermined time $\Delta t$ elapses at a time point $t_2$, the program proceeds to step , and waits for the reading of a receiving signal RS (which is produced based on a movement finish detection signal RD) to be supplied from the input port 15a as shown in FIG. 6, at (c). In this manner, by starting the reading of the receiving signal RS for the first time after the predetermined time $\Delta t$ elapses from the time point at which the vibration detection signal VD is outputted, it is possible to prevent the hitting sound generated by hitting the tennis ball 4 with the tennis racket and detected by the sound collecting microphone 3a, from being judged erroneously as a landing sound.

Then, the program proceeds to step , and it is decided whether or not the movement finish detection signal RD has been inputted from the movement finish detecting means 3. When the movement finish detection signal RD has not been inputted, the program proceeds to step , and it is decided whether or not a predetermined time $T_S$ is elapsed after the reading of the receiving signal RS is started. If the predetermined time $T_S$ is not elapsed, returns to step , and if the predetermined time $T_S$ is elapsed, that is, when the tennis ball 4 is held by the net and it does not reach the predetermined landing position, the program proceeds to step , and the reading of the receiving signal RS is stopped. Then, the program proceeds to step a, and after clearing the time measuring counter to zero, returns to step .

On the other hand, if the movement finish detection signal RD is inputted within the predetermined time $T_S$, proceeds to step . In other words, for example, when the tennis ball 4 lands on a position near the service line in the opponent's court at a time point $t_3$, an impact sound is generated due to the landing impact, and this sound is detected as the movement finish detection signal RD by the sound collecting microphone 3a as shown in FIG. 6, at (d). This movement finish detection signal RD is amplified by the amplifier 3, level converted by the level converter 3c, and the monostable multivibrator 3d is triggered as shown in FIG. 6, at (e), by a leading edge of the output of the level converter 3c. During a time period in which the output MS of the monostable multivibrator 3d is maintained in an ON state, the transmitting signal is outputted from the transmitting circuit 3e to the transmitting antenna 3f. Thus, a transmitting electromagnetic wave S is transmitted to the receiving antenna 16 of the movement speed measuring device main body 1. When the transmitting electromagnetic wave S is received by the receiving circuit 17 through the receiving antenna 16, the receiving signal RS shown in FIG. 6, at (g) is obtained from the level converter 18, and thus signal RS is inputted to the input port 15a of the microcomputer 15.

Accordingly, at the time point $t_3$ at which the receiving signal RS of the movement finish signal RD is inputted to the input port 15a, the processing in the processing unit 15c proceeds to step from step , and the counting in the time measuring counter is stopped to stop the time measurement. Then, the program proceeds to step , and after stopping the reading of the receiving signal RS, proceeds to step .

In this step , a count value of the time measuring counter is read as a measured time interval T, and based on this measured time interval T and the predetermined distance l stored in the memory 15d beforehand, the equation l/T is computed to obtain the movement speed V of the tennis ball 4, and the result of the computation is stored in a predetermined area in the memory 15d as speed display data.

Then, the program proceeds to step , and the speed display data stored in the step is outputted to the liquid crystal display 7 to display the movement speed of the tennis ball 4. Next, the program proceeds to step , and it is decided whether or not the clear switch 8 is depressed. If it is not depressed, returns to step , and if depressed, proceeds to step wherein the speed display data stored in the memory 15d is cleared to zero, and at the same time, after the time measuring counter is cleared to zero, returns to the aforementioned step .

In the processing shown in FIG. 5, the steps - correspond to the procedure performed by the time measuring means 32, and the step corresponds to the procedure performed by the computing means 33.

Accordingly, the player who served the tennis ball 4 can instantly know visually a mean movement speed of the tennis ball 4 from the movement starting time until the landing time by looking at the liquid crystal display 7 of the movement speed measuring device main body 1 mounted on the tennis racket 2 without requiring help by others.

Further, by enhancing the directivity of the sound collecting microphone 3a of the movement finish detecting means 3, and at the same time, by enhancing the detection level of the level converter 3c, it is possible to discriminate accurately the landing sound generated at the player's own court from a hitting sound and a landing sound of a tennis ball generated at another adjacent court to prevent erroneous detection.

Further, in the foregoing embodiment, although time measuring means and computing means are constituted by the microcomputer 15, the present invention is not limited to this. An alternative arrangement may be employed in which a flip-flop is set by the output of the level converter 13 and is reset by the output of the other level converter 18, and an affirmative output of the flip-flop is supplied as a gating signal to a gate circuit which controls passage of a clock pulse to the time measuring counter. The count value of the time measuring counter is supplied to a divisor terminal of a divider circuit as the measured time interval T, the predetermined distance l is supplied to a divided terminal of the divider circuit to perform the division (l/T) to calculate the movement speed V. The movement speed V is supplied to the liquid crystal display 7.

Further, in the foregoing embodiment, although the vibration sensor 11 is used as movement start detecting means for detecting the vibration wave at the movement starting time of the tennis ball 4, the present invention is not limited to this, and it is possible to detect an impact sound at the hitting time of the tennis ball by a microphone.

Still further, in the foregoing embodiment, although the liquid crystal display 7 is used as a display unit of the movement speed, the present invention is not limited to this, and a numerical display using a light emitting diode, a fluorescent display tube, etc., may be applied.

Further, in the foregoing embodiment, although the movement speed measuring device main body 1 is attached to the tennis racket 2, the present invention is not limited to this, and only the vibration sensor 11 and a radio transmitting device similar to the movement finish detecting means 3 may be attached to the tennis racket 2 so that the movement start detection signal may be transmitted over a radio wave to the movement speed measuring device main body 1 having the time measuring means, computing means, and display located at another position.

Further, in the foregoing embodiment, the present invention is applied to the movement speed measurement of a tennis ball at the time of serving in tennis. However, the present invention is not limited to this, and for example, it is possible to measure a movement speed of a golf ball, or to measure a movement speed of any moving object which generates vibration waves such as sound waves or the like at the movement starting time and at the movement finishing time and which moves a predetermined distance.

I claim:

1. Device for measuring the speed of a moving object wherein said moving object generates first and second vibration waves such as sound waves respectively at a movement starting time and at a movement finishing time after moving a predetermined distance, comprising:

movement start detecting means for detecting the first vibration wave generated by said moving object at the movement starting time, said movement start detecting means including a vibration sensor;

means for hitting said moving object to give an initial speed thereto, the vibration sensor being attached to the means for hitting;

movement finish detecting means for detecting the second vibration wave generated by said moving object at the movement finishing time;

time measuring means for measuring a time interval between a time point at which the first vibration wave is detected by said movement start detecting means and a time point at which the second vibration wave is detected by said movement finish detecting means;

speed computing means for computing speed of movement of said moving object on the basis of the time measurement result obtained by said time measuring means and the predetermined distance; and a display unit for displaying the result obtained by said speed computing means.

2. The device of claim 1 wherein said movement start detecting means, said time measuring means, said speed computing means, and said display unit are mounted in a common case, and a detection result obtained by said movement finish detecting means is supplied to said time measuring means over a radio wave.

3. The device of claim 1 wherein said moving object is a tennis ball, and said hitting means is a racket.

4. The device of claim 3 wherein said movement finish detecting means is a sound collecting microphone having a directivity.

* * * * *